United States Patent [19]

Landry

[11] 4,074,442
[45] Feb. 21, 1978

[54] APPARATUS FOR TEACHING AND PLAYING CONTRACT BRIDGE

[76] Inventor: Joseph Gérard Landry, 754 Raymond St., St. John, Canada

[21] Appl. No.: 711,549

[22] Filed: Aug. 4, 1976

[51] Int. Cl.² ............................................. G09B 19/22
[52] U.S. Cl. ................................. 35/8 B; 273/148 R
[58] Field of Search .......... 35/8 B; 273/148 R, 148 A

[56] References Cited

U.S. PATENT DOCUMENTS

| | | | |
|---|---|---|---|
| 2,038,734 | 4/1936 | Hardy | 35/8 B |
| 2,124,941 | 7/1938 | Ellis | 35/8 B |
| 2,200,195 | 5/1940 | Thorne | 35/8 B |
| 2,204,199 | 6/1940 | Willis | 35/8 B |
| 2,395,087 | 2/1946 | Von Babo | 35/8 B |
| 2,486,891 | 11/1949 | Stroh | 35/8 B |
| 2,655,736 | 10/1953 | Lipschitz | 35/8 B |
| 3,287,826 | 11/1966 | Shilling | 35/8 B |
| 3,939,577 | 2/1976 | Amano | 35/8 B |

*Primary Examiner*—William H. Grieb

[57] ABSTRACT

An apparatus adapted to teach contract bridge and other card games and also to ordinarily play contract bridge and distinctively comprising a preferred sequence of play indicia juxtaposed to playing card indicia respectively to directly indicate the preferred sequence of play of each playing card indicium, slides attached and slidable in overlying relationship each relative to a playing card indicium and a corresponding sequence of play indicia and settable in anyone of three distinct positions indicative of the cards played and the tricks won and lost, shields concealing the playing card indicia of each player from the other players' view, a flap to selectively conceal the sequence of play indicia and in cooperation with the shields to allow ordinary playing of contract bridge, and a central portion with a removable cover to provide instructions to each player on how to play the cards in hand.

4 Claims, 7 Drawing Figures

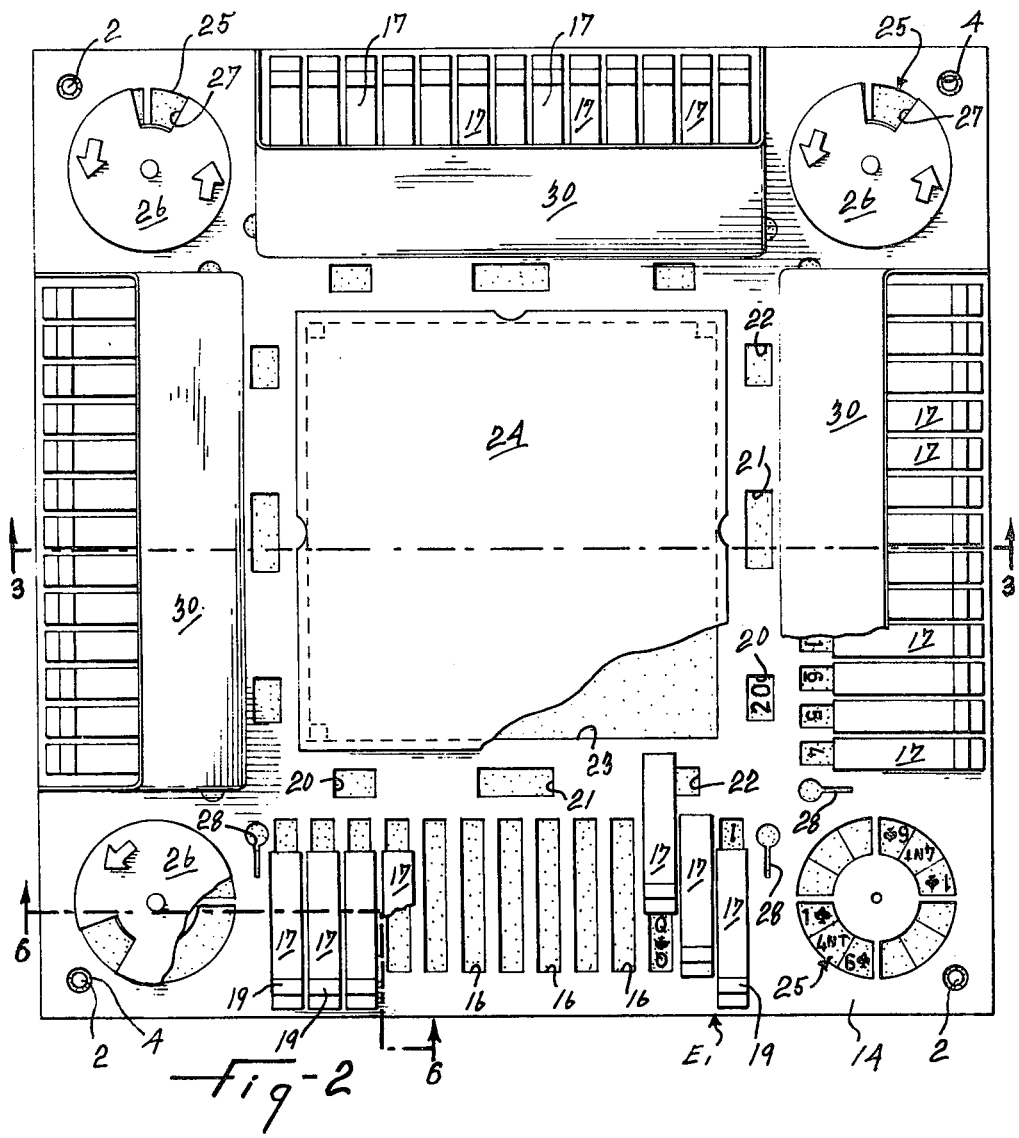
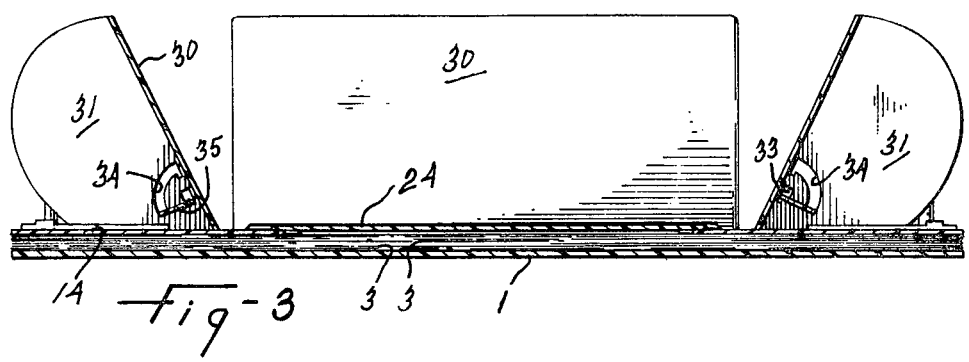

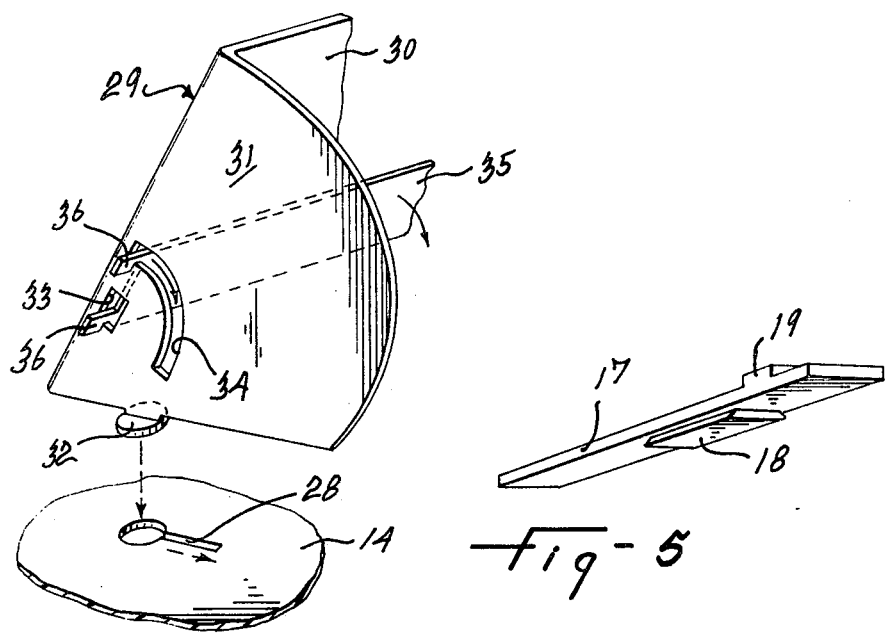
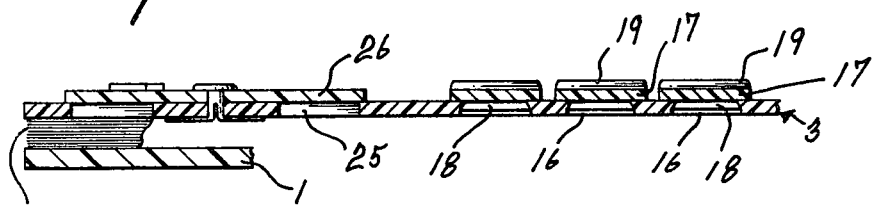
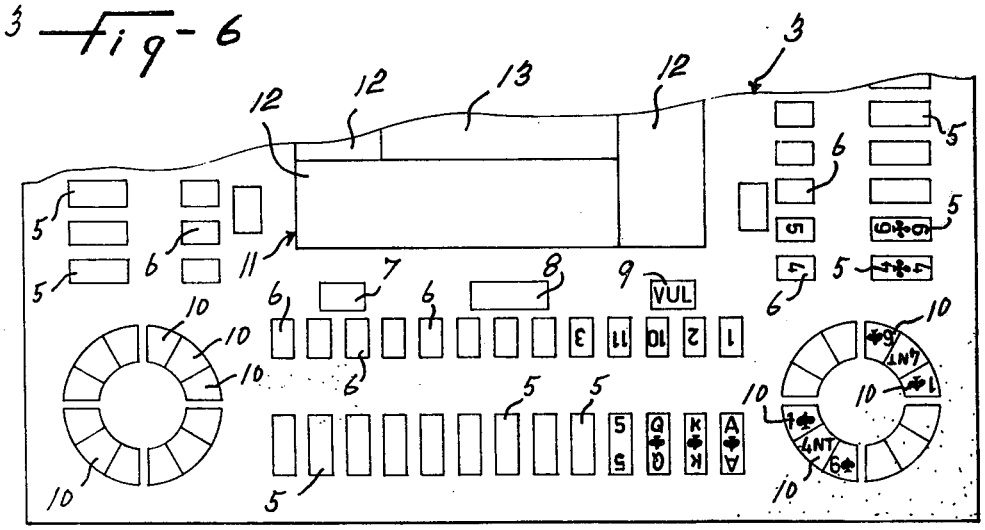

APPARATUS FOR TEACHING AND PLAYING CONTRACT BRIDGE

This invention relates to an apparatus pertaining to the playing and teaching of card games and, more particularly, to an apparatus of the type adapted for playing and teaching contract bridge.

There have so far been proposed different apparatuses of the above type. In particular, in U.S. Pat. No. 2,655,736, there was proposed an apparatus of the above type which includes a base plate, an intermediate sheet bearing indicia indicative of playing cards grouped in distinct series representing different players' hands, a top plate with apertures registering with the indicia on the intermediate sheet, and series of playing pieces forming separate elements which are operatively positioned in these apertures to simulate playing of the corresponding playing cards. The indicia on the intermediate sheet include sequence of play indicia on the opposite side of the sheet compared to the playing card indicia.

In the afore-described and patented apparatus, there are separate playing pieces beside the playing card indicia on the intermediate sheet. These playing pieces removably slide in corresponding guideways formed by apertures in the top plate. Obviously, the separate playing pieces are liable to be lost and impose trial-and-error matching of any playing piece with the corresponding indicium on the intermediate sheet. Besides, the patented apparatus does not provide means to conceal the playing card indicia and, thus, does not allow to play a game in the ordinary manner; it does not either provide means to mark the tricks won and lost; it does not provide a direct relationship between a given playing card indicium and the sequence of play of this card; and it does not include instructions on each sheet to indicate how each player should bid and play with his specific series of playing card indicia.

It is a general object of the present invention to provide an apparatus of the above type which is of relatively simple construction and improved operation.

It is another general object of the present invention to provide an apparatus of the above type which can be used for teaching card games as well as for conventional playing of card games, in particular contract bridge.

It is a further object of the present invention to provide an apparatus of the above type for teaching and playing card games wherein there is a base plate operatively carrying the other components and forming a carrier for a supply of sheets bearing card playing indicia.

It is another object of the present invention to provide an apparatus for teaching and playing contract bridge wherein there are no loose playing pieces which could be lost.

It is another object of the present invention to provide an apparatus for teaching and playing contract bridge wherein no trial-and-error matching is required.

It is another object of the present invention to provide an apparatus for teaching and playing contract bridge which includes slides that not only indicate the card played but that also indicate the tricks won and the tricks lost.

It is a further object of the present invention to provide an apparatus for teaching and playing contract bridge which includes shields concealing the playing cards indicia of each player from view by the other players for ordinary playing of a card game.

The above and other objects and advantages of the present invention will be better understood with reference to the following detailed description of a preferred embodiment thereof, which is illustrated, by way of example, in the accompanying drawings, in which:

FIG. 2 is a plan view of the apparatus of FIG. 1 with parts removed to better illustrate the underlying elements;

FIG. 3 is a cross-sectional view as seen along line 3—3 in FIG. 2;

FIG. 4 is a detail view in perspective of part of a shield and the associated elements;

FIG. 5 is a cross-sectional view of a slide forming part of the apparatus of FIG. 1;

FIG. 6 is a cross-sectional view as seen along line 6—6 in FIG. 2; and

FIG. 7 is a plan view of part of a sheet forming part of the apparatus of FIG. 1.

Figure 1:
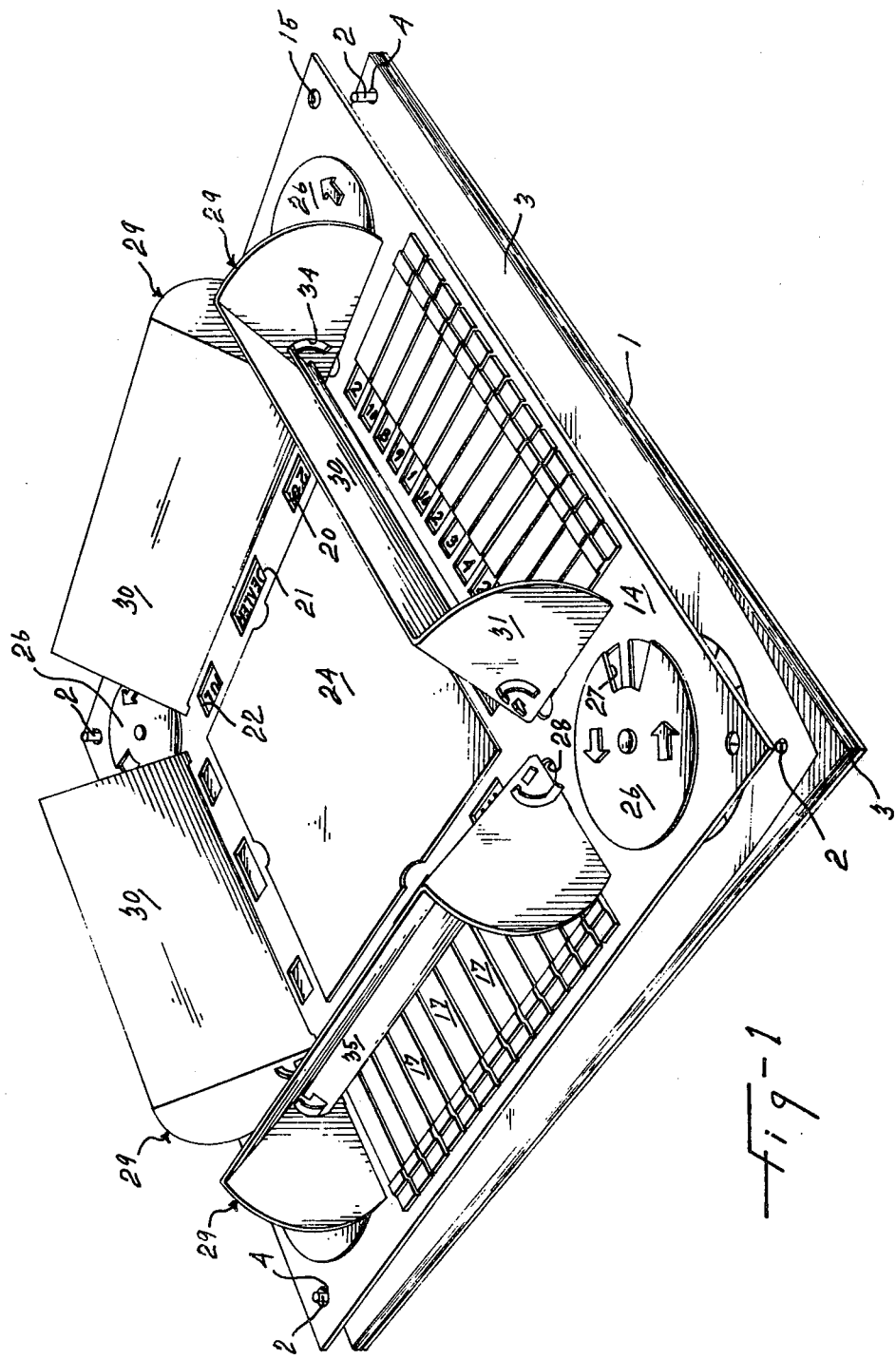
FIG. 1 is a perspective view of an apparatus according to the present invention for playing and teaching contract bridge.

The illustrated apparatus for teaching and playing contract bridge includes a base plate 1 having pins or posts 2 projecting upward therefrom at the corners thereof respectively. The base plate 1 is of square shape defining four playing sides and has the posts 2 integrally formed therewith of plastic. This base plate 1 is constructed to form a support for one or more playing and teaching sheets 3, each having four holes 4 at the corners thereof respectively for engagement of the pins or posts 2 in these holes. The sheets 3 are also square and coextensive with the base plate 1.

Each sheet 3 bears all the information and indicia necessary to play a deal and to teach how to play the same deal. In particular, each sheet 3 includes a series of playing card indicia 5 arranged in a straight row along each edge of the sheet. Series of sequence of play indicia 6 are also arranged in straight rows and extend parallel with the rows of playing card indicia 5 respectively. Thus, in each row and for each hand or player, there are thirteen indicia and each sequence of play indicium 6 registers with a playing card indicium 5 transversely of the corresponding rows to indicate the preferred sequence of play of the corresponding playing card indicium. Thus, looking at FIG. 7, it may be seen that the sequence of play indicium 1 is transversely aligned with the Ace of spades indicium to indicate that the Ace of spades should be played first by the corresponding player. It is also indicated that the Queen of spades should be played tenth.

For each player, above the two rows of indicia 5 and 6, there are three indicia 7, 8, and 9 respectively indicating the part score, the dealer and the vulnerable player. In each corner in any sheet 3, there is a circular series of bridge bid indicia 10 arranged each with a diagonally opposite duplicate, such as the diametrically opposite 6 space indicia, in FIG. 7. The duplicate indicia are arranged upside down relative to each other to allow reading thereof by all players around the table.

Each sheet 3 is also provided with a central portion 11 inwardly of the rows of indicia 5 and 6. The central portion 11 is marked with information to teach the player or players how to handle any particular situation. The central portion 11 is divided into four edge strips 12 extending parallel with the rows of indicia and edges respectively, such that each edge strip 12 is written upright for the corresponding side and player and contains the instructions which are specifically for the corresponding player. The central portion 11 also includes a central area 13 for general instructions of interest for all the players.

All the afore-mentioned indicia 5 to 10 inclusive are on the same one face of a sheet 3. The opposite face of each sheet is marked with all the necessary blank squares or spaces of the indicia bearing one face but is not marked with indicia. This other side may thus be used as a blank to mark any deal of playing cards and the corresponding sequence of play and bids.

A top plate 14 is operatively mounted over the base plate 1 and rests on the topmost sheet 3. The top plate 14 is also made of plastic and has a hole 15 at each corner for engagement of the posts or pins 2 therein. A series of elongated apertures 16 is provided along each edge of the top plate 14, such that each elongated aperture extends transversely coextensively with a playing card indicium 5 and the corresponding sequence of play indicium 6. Thus, for each player, there are 13 elongated apertures 16 overlying the corresponding 13 indicia 5 and 13 indicia 6. As best seen in FIG. 6, each elongated aperture 16 is of trapezoidal transverse cross-sectional shape to form a guideway for a slide 17. Each slide 17 includes a bottom portion 18 of appropriate trapezoidal transverse cross-section to be slidably retained in the guideway or aperture 16. Each slide 17 is also integrally formed with an upward projection 19 to provide a fingergrip. The bottom projection 18 is shorter than the slide 17 to allow sliding of each slide for forward or rearward projection relative to the corresponding elongated aperture 16, as shown in FIGS. 1 and 2. Thus, each slide may be placed in a position to fully cover the aperture 16 and thus conceal both the corresponding playing card indicium and the corresponding sequence of play indicium. Each slide 17 may also be placed to either uncover solely the sequence of play indicium or to uncover solely the playing card indicium. Thus, each slide 17 is displaceably between three essentially distinct positions: a position covering both the playing card indicium and the sequence of play indicium; a position uncovering only the playing card indicium; and a position uncovering only the sequence of play indicium.

Three apertures or windows 20, 21, and 22 are provided adjacent each set of apertures 16 and inwardly of the latter. These windows register with the indicia 7, 8, and 9. A large central window or opening 23 is provided in the top plate 14 centrally of the elongated apertures 16 in operative overlying relationship relative to the central portion 11 of a sheet 3. A cover, or plate 24, is normally placed over the aperture 23 to conceal the information on the central portion 11 but to be removed to read the instructions.

A circle of apertures 25 is formed in each corner of the top plate 14 in overlying registry with the corresponding circle of bridge bid indicia 10. A bridge bidding disc 26 is rotatably riveted in overlying registry with each circle of apertures 25 and bridge bid indicia 10. Each disc 26 is formed with a peripheral notch 27 in registry with the circle of bridge bid indicia 10 and of sufficient peripheral length to display two consecutive bridge bid indicia. Upon rotation of any disc 26 in the direction of the arrows thereon, the corresponding bridge bidding sequence is exposed through the corresponding notch 27. As seen from FIGS. 2 and 7, each player has its bidding indicia 10 and disc 26 on his right relative to his rows of indicia 5 and 6.

A pair of slots 28, each having a wider end, are formed in the top plate 14 at the opposite ends respectively of each series of elongated apertures 16. Shields 29 are positioned on the top plate 14 to each conceal the indicia 5 and 6 of a corresponding series of apertures 16, so that these indicia of one player may be concealed from view by any other player. Each shield 29 includes an inclined front panel 30, supporting end panels 31, and a pair of circular anchoring lugs 32 removably engaging in the corresponding slots 28, as shown in FIG. 4.

Each supporting end panel 31 is formed with a first aperture 33 and an arch-shaped second aperture 34 coaxial with the corresponding aperture 33. A strip 35, formed with connecting lugs 36 at each end, is removably securable in each shield 29 by engagement of each pair of lugs 36 in the corresponding apertures 33 and 34, as shown in FIGS. 1, 3, and 4.

The shields 29 are needed and used to play a bridge game in ordinary manner, in which case the hand or cards of each player must not be known or seen by the other players. The strips 35 may be pivoted to either show or conceal the sequence of play indicia 6.

This apparatus may be used to ordinarily play bridge or to teach bridge to one, two, three or four persons. It must be noted that no cards or playing pieces are used. The playing card indicia 5 replace the cards.

Any number of different sheets 3 may be made to teach as many different problems or practical situations. Each sheet 3 corresponds to one deal of the cards. Stacks of sheets 3 may be separately sold, for instance, on a base plate 1 used as a support therefor. All the sheets 3 are piled on the base plate 1 when the apparatus is put away.

The removable shields 29 allow to remove the shield of the dummy to expose his playing card indicia 5 by appropriate sliding of the slide 17.

The playing card indicia are preferably placed in non-numerical sequence for each suit of each player to avoid identification of the number of cards in each suit by any other player.

The sequence of play indicia 6 may be purposely arranged with an error to more easily illustrate a possible fault.

The three different positions of the slides 17 allow to indicate the tricks won and the tricks lost with the slides 17 of the dummy. For instance, the tricks won are indicated by the corresponding slides in one position and the tricks lost are indicated by the corresponding slides in another position.

A single player may use the apparatus in two different ways. For instance, after having seen the bids and the announcement, he may solve the illustrated problem either by concealing the hands of the opponents, with the corresponding slides 17, or he may study the four hands, with all the slides fully in. He conceals the instructions and the sequence of play indicia. Thus, the outward position of the slides is not used.

The single player may instead play against three invisible experts. He always plays the hand of the declarer. The dummy's hand is exposed by inward sliding of the slides. Of the two experts' hand, he sees only the sequence of play indicia. The shields 29 are not used when only one player uses the apparatus.

For two players, only two shields are used. One player plays the declarer's hand, while the other is an opponent with an invisible expert as partner. The tricks are played in the indicated order; thus, with the hiding strips 35 in non-hiding position.

If three persons are playing, only the dummy is an invisible expert; that is, with the sequence of play indicia exposed such that his playing card indicia are played in the "expert" sequence. The three other real players have then the choice to play in the indicated sequence or with their sequence of play indicia hidden by their strip 35.

With four players, all the hiding strips 35 must be either hiding the sequence of play indicia 6 or exposing them for play in the recommended sequence.

When the strips 35 are lifted to expose the sequence of play indicia, the players play according to the suggested bidding while mentally comparing their own bidding with the recommended bid but naming the latter. This way, each player learns the proper way of bidding. The score is not then marked.

When the strips 35 are lowered, the players make their own bids and reach their own contract. When the bidding is completed and the announcement is made, the shield 29 is removed from the dummy's hand and the corresponding slides 17 are inwardly slid to expose the dummy's playing card indicia. The score is marked in ordinary manner. A different scoring method may be worked out. After a deal has been played, the players may consult the instructions written in the central portion 11.

I claim:

1. An apparatus for teaching and playing a card game comprising a baseplate, at least one sheet operatively resting on the baseplate, having playing cards indicia marked on one face thereof and arranged in series each representative of a player's hand, and having sequence of play indicia marked on said one face and arranged in series repesentative of a sequence of play, each of said sequence of play indicium registering with a corresponding playing card indicium in a transverse direction relative to the corresponding series of playing card indicia, a top plate overlying said one sheet and having series of elongated apertures, each of said elongated apertures operatively extending lengthwise in one of said transverse directions and overlying the corresponding sequence of play indicium and playing card indicium, slides slidably attached to said top plate and retained in overlying relationship with said apertures respectively, each slidably displaceable lengthwise in the transverse direction defined by the corresponding sequence of play indicium and playing card indicium, and each settable in anyone of three distinct positions including a position overlying both corresponding indicia, a position uncovering only the corresponding sequence of play indicium, and a position uncovering only the corresponding playing card indicium, and shields operatively fixed on said top plate and concealing said series of indicia from other players' views, as compared to the player having the corresponding hand, and wherein each of said shields operatively overlies both corresponding series of sequence of play indicia and playing card indicia and a flap is adjustably carried in each shield and selectively conceals the corresponding series of sequence of play indicia.

2. An apparatus as defined in claim 1, wherein said series extend lengthwise along edge portions respectively of said one sheet, the latter has playing instructions marked on a center portion thereof inwardly of said series of indicia and edge portions, said top plate has a central aperture in overlying registry and with the central portion of said one sheet, and a panel is removably engaged on said top plate in overlying relationship with the central aperture and the central portion of said one sheet.

3. An apparatus as defined in claim 2, wherein a plurality of sheets each bearing said series of sequence of play indicia and of playing card indicia, and said playing instructions are stacked on said baseplate, and have each a predetermined set of positioning apertures, the baseplate forms a carrier for said sheets and includes positioning posts projecting endwise upwardly therefrom and operatively engaging into said positioning apertures and thereby holding said sheets on the baseplate.

4. An apparatus as defined in claim 3 and adapted for teaching and playing contract bridge, wherein a series of bridge bid indicia is marked adjacent each series of playing card indicia, the top plate includes apertures registering with the bridge bid indicia, and a bidding disc is rotated onto the top plate in overlying relationship with each series of bridge bid indicia and includes a window registerable with any bridge bid indicium of the corresponding series of bridge bid indicia.

* * * * *